United States Patent [19]

Donner et al.

[11] 3,950,858

[45] Apr. 20, 1976

[54] ELECTRONIC PITCH TESTER FOR GEARS

[75] Inventors: Meinrad Donner, Nuolen; Urs Walliser, Bronschhofen; Guy-Francois Blanc, Zurich, all of Switzerland

[73] Assignee: Maag Gear-Wheel & Machine Company Limited, Zurich, Switzerland

[22] Filed: Sept. 13, 1974

[21] Appl. No.: 505,905

[30] Foreign Application Priority Data

Mar. 15, 1974 Germany............................ 2412574

[52] U.S. Cl....................... 33/179.5 R; 33/179.5 D
[51] Int. Cl.².......................... G01B 5/20; G01B 7/28
[58] Field of Search.................. 33/179.5 R, 179.5 D

[56] References Cited
UNITED STATES PATENTS 3,522,524 8/1970 Smith et al...................... 33/179.5 R
3,741,659 6/1973 Jones, Jr........................ 33/179.5 R Primary Examiner—Houston S. Bell, Jr.
Assistant Examiner—Willis Little
Attorney, Agent, or Firm—Toren, McGeady and Stanger

[57] ABSTRACT

Gear pitch testing apparatus has a computer control for programming relative displacements between a gear and a pair of probes, and means for automatically comparing test data with stored reference values to indicate deviations in the gear under test. Initial setting of the apparatus for a test sequence requires the operator only to control the relative displacements of the gear and probes to synchronise them approximately, the coarse adjustment thus obtained then being automatically modified in an electronically controlled fine adjustment stage to co-ordinate the movement between the gear and the probes accurately and allow such characteristics as absolute cumulative pitch error to be evaluated.

11 Claims, 11 Drawing Figures

ELECTRONIC PITCH TESTER FOR GEARS

BACKGROUND OF THE INVENTION

The invention relates to an electronic pitch testing apparatus for gears.

Such apparatus is known comprising a probe unit having two stylus heads arranged side-by-side on a slide and which in one end position of the slide engage simultaneously in different tooth spaces of a gear and, because of a deflection produced by bearing against the tooth flanks, each produce, via a transmitter, electrical signals from which a signal for controlling the drive of the slide and a measurement value corresponding to the relative single pitch error are derived and recorded. One example of such apparatus is to be found in U.S. Pat. No. 2,906,030.

In the apparatus described there, the spacing of the stylus heads is initially so adjusted manually with the test element or gear stationary that both stylus heads bear against one tooth flank. A slow, constant rotation is then imposed on the test element. With each measurement and at the instant in which the one signal transmitter indicates a theoretical or rated value, a datum is established from the signal value indicated at the same instant by the other signal transmitter. The moment at which the rated value appears is further employed for initiating the movement of the slide. The speed of movement of the slide, which automatically reverses at its rearward end position and stops automatically in its forward end position in which the stylus heads extend into the gear tooth spaces, is adapted manually by way of a potentiometer to the speed of rotation of the test element.

With this and other known pitch testing apparatus, the establishment of the relative cumulative pitch error involves considerable difficulties, because, for this purpose, the initial setting of the spacing of the stylus heads must be as accurately as possible equal to the actual means value of the pitch on the circle probed by the apparatus. Otherwise, high relative cumulative pitch errors can be produced after a few separate measurements, such that these errors exceed the range of measurement of the testing instrument being used or the recording range of the recorder. The initial setting of the stylus heads would then have to be corrected, and the test series begun again.

A further characteristic of such known pitch testing apparatus is that other gear defects, such as maximum pitch overlap length and absolute cumulative pitch error, cannot be recorded at all or only after tedious evaluating operations. Furthermore, the apparatus contains an extensive group of instruments, which can only with difficulty be arranged on the gear machine itself.

SUMMARY OF THE INVENTION

The present invention provides gear pitch testing apparatus comprising two probe elements arranged side-by-side on a mounting that is displaceale to introduce the elements into a respective pair of tooth spaces of a gear to be tested, the probe elements being arranged to produce electrical signals through respective signal transmission means in dependence upon the deflection of the elements by the gear tooth flanks, caused by transverse linear or angular motion of the gear relative to the elements, means being provided to derive, from said signals, further signals to actuate displacements of the mounting and to provide measurement values corresponding to the relative separate or circular pitch errors, the apparatus further comprising a counter coupled with time base generation means for otaining predetermined timing settings for the displacements of said mounting in sequence with said transverse relative movement between the gear and the elements, a process computer being provided with a store for said measurement values and said timing settings and with means for computing from the stored data deviations in pitch in the gear under test, such as absolute pitch error, pitch overlap lengths and cumulative pitch error.

It is possible to arrange that said apparatus establishes the pitch errors in a fully automatic manner and simultaneously records them. Furthermore, it is possible to avoid the necessity for an accurate initial setting of the spacing of the probe elements or stylus heads, which can permit a considerable saving of time in the testing process.

The probe elements and their mounting can form a relatively compact unit to be disposed directly on a gear production machine. It can be arranged that all the functions of a test process can be initiated from that unit while the process computer, through its programme routine, controls the operation of the unit, takes over programmed evaluating operations and controls recording instruments for the test results.

The apparatus may comprise a measuring circuit connected to the process computer by way of an analog-digital converter and a digital-analog converter, one input of the analog-digital converter being connected via an analog store or memory circuit to the one signal transmission means and the digital-analog converter being connected via the two inputs of a comparator to the other signal transmission means, and the output of the comparator is connected via an internal timing sequence control member which explores the analog memory circuit to a second input of the analog-digital converter, through which the analog-digital converter is activated. This measurement circuit makes it possible, by control from the process computer, for the initially only coarsely adjusted probe elements or stylus heads to be finely adjusted electronically after a few measurements, so that any initial incorrect setting of the spacing of the heads is compensated for. In this way, space is saved in the data store or memory of the process computer and it is assured that all components of the measurement circuit work in their best possible operational range.

A bistable element can be coupled to the counter via the process computer, said element being set according to the counter position and controlling the drive means for the mounting of the probe elements through a servo amplifier in accordance with its two states. Through this synchronising circuit, the movement of the slide at the commencement of the testing operation is adapted to the movement of the gear which is to be measured.

In one preferred construction form, the process computer has coupled with it a synchronising key, with the actuation of which the counter starts and the mounting with the probe elements is moved into its end position towards the gear, at which position, through the process computer and an activating line, output gates of the counter are activated and a first counter value is read off and is stored in the memory and, on a signal given by the measuring circuit during the measurement, a second counter value is stored, the process computer resetting the bistable element after the measurement and as soon as the mounting thereupon reaches its end position further from the gear, a third counter value is stored, and that on releasing the synchronising key after further movement to a relative transverse position corresponding to the initial position but at a subsequent tooth space, a fourth counter value is stored: the memory thereafter sets the counter with the sum of the four counter values so that the forward and reverse feeding of the mounting is controlled according to the stored counter values. With the synchronisation between the drive means for the mounting and the movement of the test element, an operator merely has to release the synchronising key when a following tooth space is situated before each probe element, so that the synchronisation is achieved.

The apparatus is advantageously constructed in such a way that the counter delivers a transmission signal through a transmission line to the process computer with a deviation between a stored reference value and the actual counter value existing at the instant of the signal supplied by the measurement circuit during the measuring operation, and corresponding to this transmission signal, the movement of the mounting is controlled in the following measuring or testing operation. The result achieved with this circuit is that, in the event of a non-uniform movement of the gear or of an initially imperfect synchronisation between the movement of the gear and the movement of the slide, the resulting synchronising error is automatically cancelled out.

A control line may lead to the drive means of the machine on which the test gear is mounted so that the machine and thus the movement of the gear can be controlled from the pitch testing apparatus.

The apparatus advantageously comprises manual keys which, controlled from the process computer, indicate their readiness for operation and, with manual actuation, initiate the respective next step of the test programme. In this way, the testing procedure if simplified to such an extent that even unskilled operators may be able to handle the pitch testing apparatus.

The apparatus may further comprise an input and output device into which gearing data and highest permissible error data are introduced as input values of the programme of the process computer. It is possible in this way for the measurement or test series to be automatically ended after a certain number of measurements have been made and for only those test values to be printed out which go beyond a maximum permissible deviation. The input and output unit advantageously comprises decade switches for the various input values.

BRIEF DESCRIPTION OF THE DRAWINGS

The invention will be more particularly described by way of example with reference to the accompanying diagrammatic drawings, in which.

DESCRIPTION OF A PREFERRED EMBODIMENT

Figure 1:
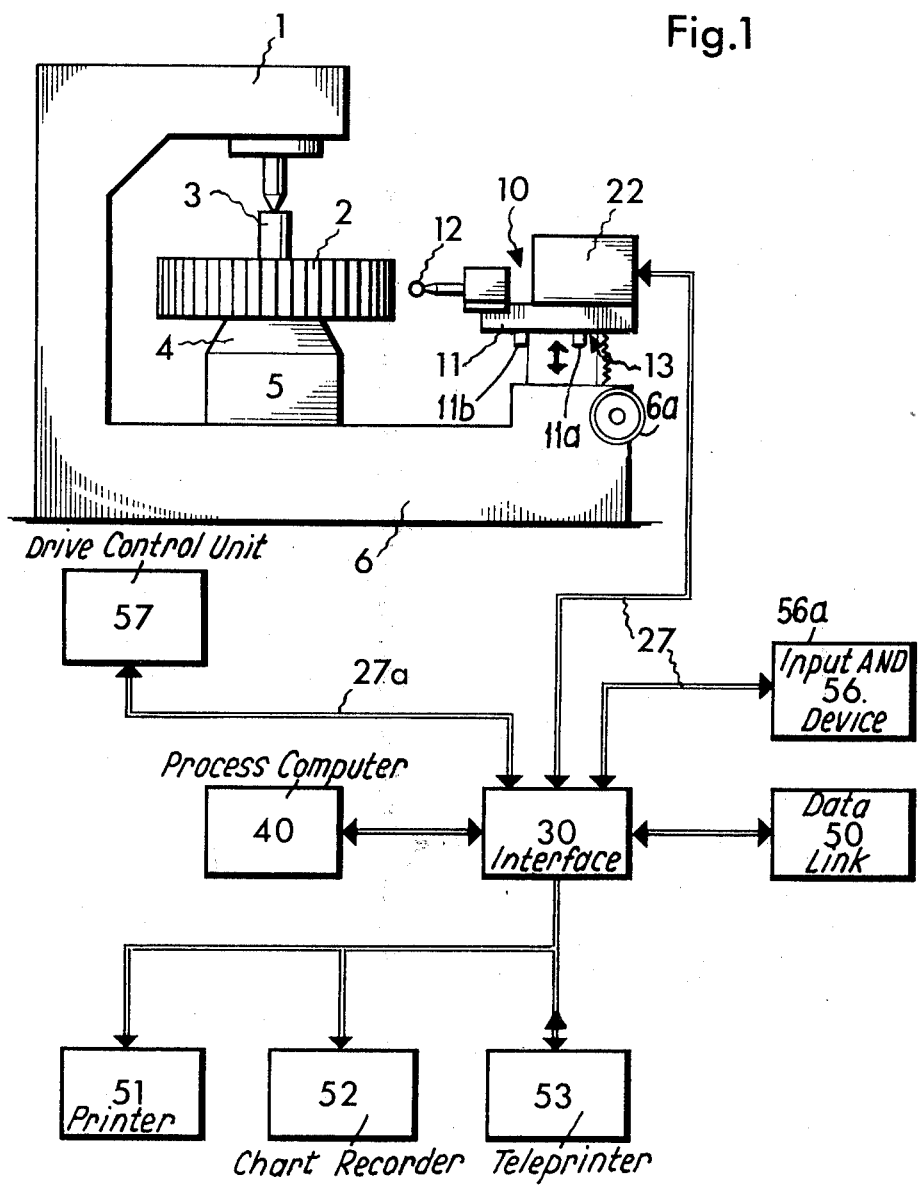
FIG. 1 is a block circuit diagram of pitch testing apparatus according to the invention in co-operation with a gear production or measuring machine.

FIG. 1 shows a gear 2 to be tested mounted on a mandrel 3 or a table 4 on a gear production and/or measuring machine 1 and arranged to be driven in rotation by a rotary drive means 5. Also accommodated on the frame 6 of the gear production and/or measuring machine 1 is the stylus unit 10 of a pitch tester, which comprises a slide 11 with probe or stylus heads 12. The slide 11 is vertically adjustable by a control unit 6a on the frame 6 and is also movable forwards and backwards by a drive means 13 (FIG. 6), for example, by an electric motor through a rack and pinion, so that the stylus heads 12 are moved into and out of the tooth spaces of the gear.

The stylus unit 10 is connected via a data line 27 to a computer interface 30 of the apparatus. The interface 30 is connected to a process computer 40, data link 50 for the connection to a central data-processing unit, and output instruments, such as a printer 51, a chart recorder 52 and a teleprinter 53. The interface 30 is also connected to an input and output device 56 and, via a control line 27a, to a control unit 57 for the rotational drive 5 of the machine 1. The interface 30, the process computer 40, the data link 50 and the input and output device 56 are assembled in a single housing to form a control and evaluating unit.

Figure 2:
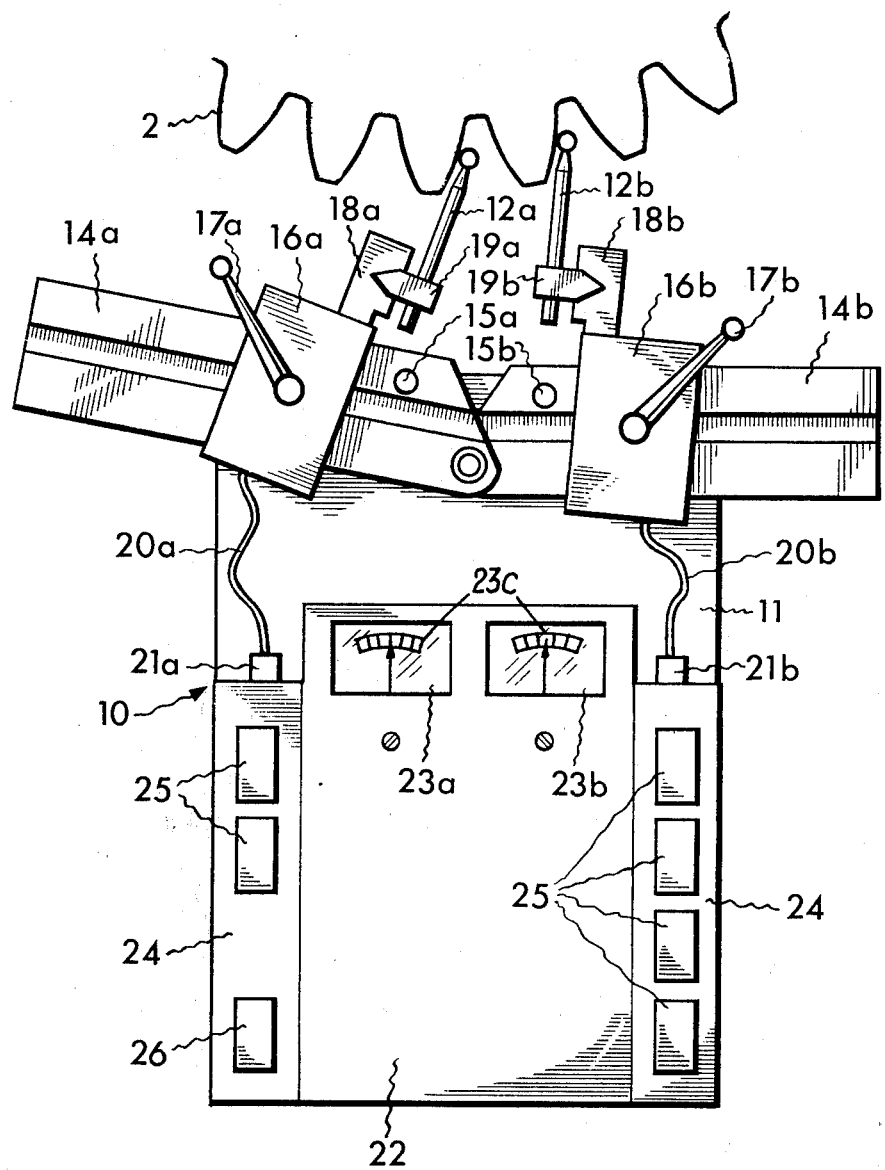
FIG. 2 is a plan view of the probe or stylus unit of the apparatus of FIG. 1.

As will be seen from FIG. 2, two rails 14a, 14b provided with T-section guideways are arranged on the slide 11 of the stylus unit 10 extending transversely of the direction of slide movement and can be secured in their angular positions by screwbolts 15a, 15b. Along the respective rails, blocks 16a, 16b can be slid and can be fixed by respective clamping levers 17a, 17b. Arranged in each lock through a signal value transmitter (indicated by references 36a, 36b in FIG. 3 and being for example of the inductive type) is a respective holder 18a, 18b, each of which accommodates a stylus head 12a, 12b. Each stylus head is held by means of a bolt or pin 19a, 19b which is resiliently secured in the holder, so that the head can be easily replaced by withdrawing the pin and twisting.

The signal value transmitters are connected through lines 20a, 20b to inputs 21a, 21b on a housing 22. Also shown on the housing in FIG. 2 are two voltage measuring instruments 23a, 23b and an operating panel 24 with operating keys 25 and a synchronising key 26.

Figure 3:
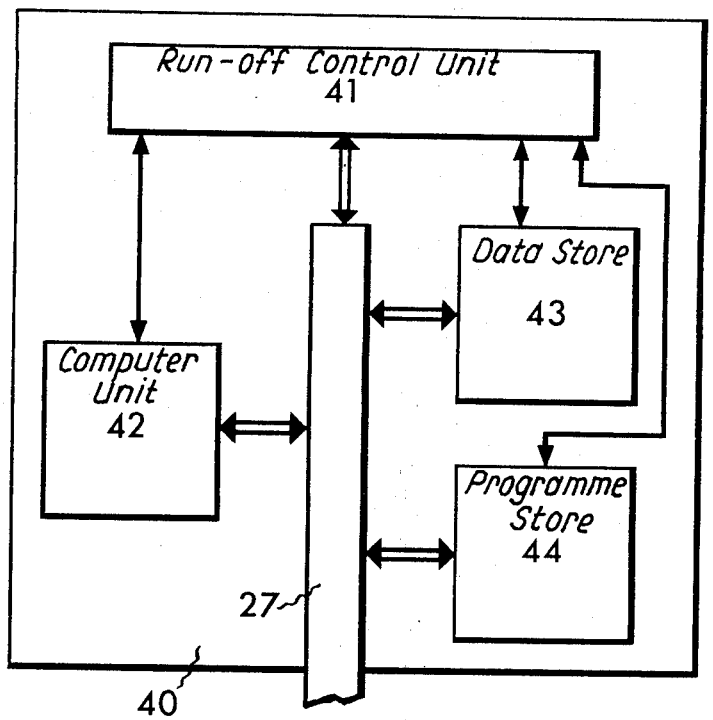
FIG. 3 is a block circuit diagram of the process computer.

Referring now to FIG. 3 the process computer 40 comprises a run-off control unit 41, a computer unit 42, a data store or memory 43 and a programme store 44 and is connected in blocks to the data line 27 in known manner.

Figure 4:
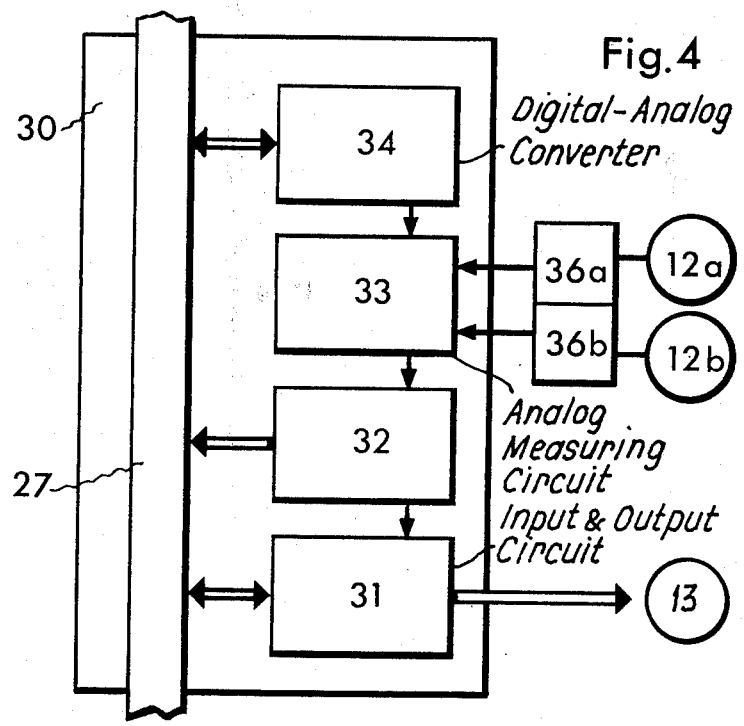
FIG. 4 is a block circuit diagram of the computer interface.

Contained in the interface 30, as shown in FIG. 4, are an input and output unit 31, an analog-digital converter 32, an analog measuring circuit 33 and a digital-analog converter 34. Lines lead to the analog measuring circuit from the signal transmitters 36a, 36b connected to the stylus heads 12a and 12b.

Figure 5:
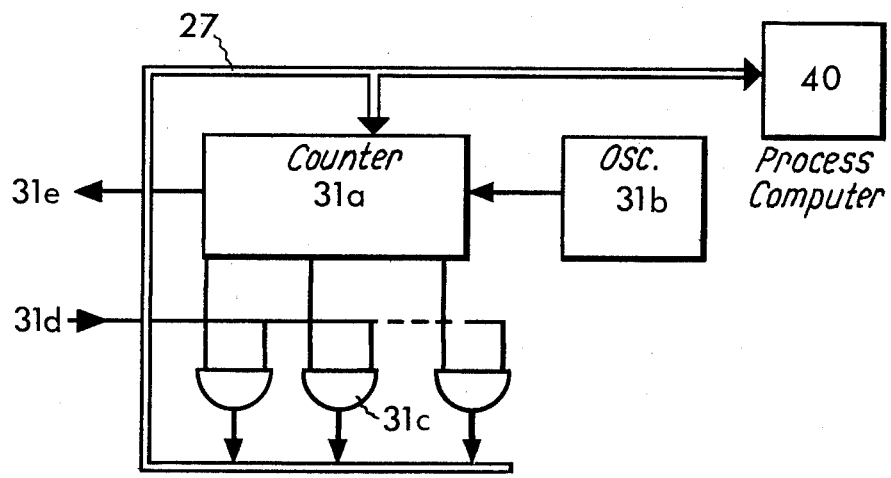
FIG. 5 is a block circuit diagram of the counter section of the interface.

The input and output unit 31 also includes a counter unit which is shown in FIG. 5 and which has a counter 31a, which is connected to an oscillator 31b providing a time base and is read off via output gates 31c, which each have second inputs connected to an activating line 31d. The counter 31a can also provide an output through a transmission signal line 31e.

Figure 6:
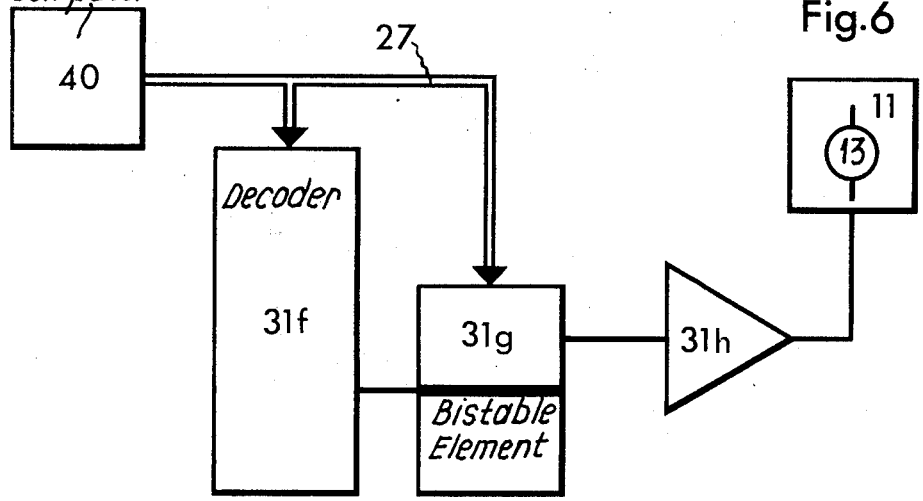
FIG. 6 is a block circuit diagram of the control for the drive means of the probe or stylus unit.

The input and output unit 31 also includes, as shown in FIG. 6, a decoder 31f which is connected to the data line 27, a bistable element 31g, for example a flip-flop, which is connected to the data line 27 and the decoder and which is connected to a servo amplifier 31h for the drive means 13 of the slide 11 of the stylus unit 10.

Figure 7:
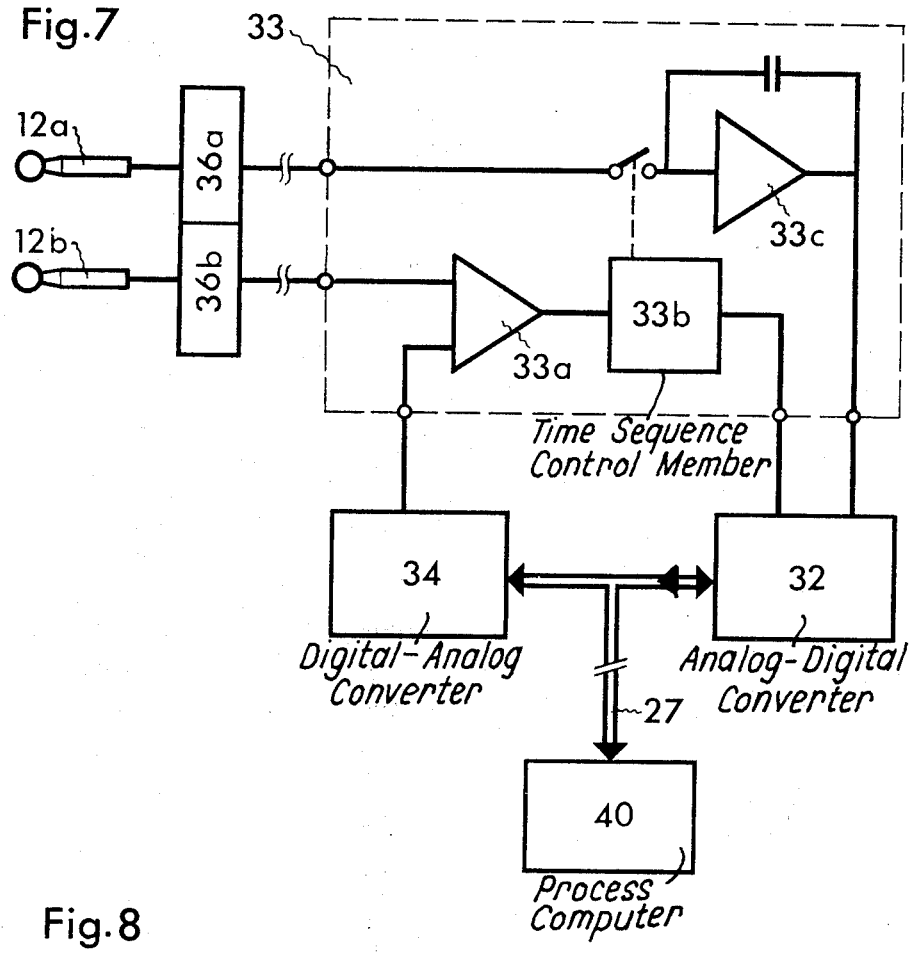
FIG. 7 is a block circuit diagram of the measuring circuit of the interface.

The analog measuring circuit 33 will be more fully explained by reference to FIG. 7. The output of the signal transmitter 36b is connected to one input of a comparator 33a, of which the output is connected to an internal time sequence control member 33b, which is connected to one input of the analog-digital converter 32. The second input of the comparator 33a is connected to the digital-analog converter 34. The output of the signal transmitter 36a is connected to the input of an analog storage circuit 33c, the output of which is connected to another input of the analog-digital converter 32. The output of the internal time sequence control member 33b is connected to an electronic switch for keying the analog storage circuit 33c.

Figure 8:
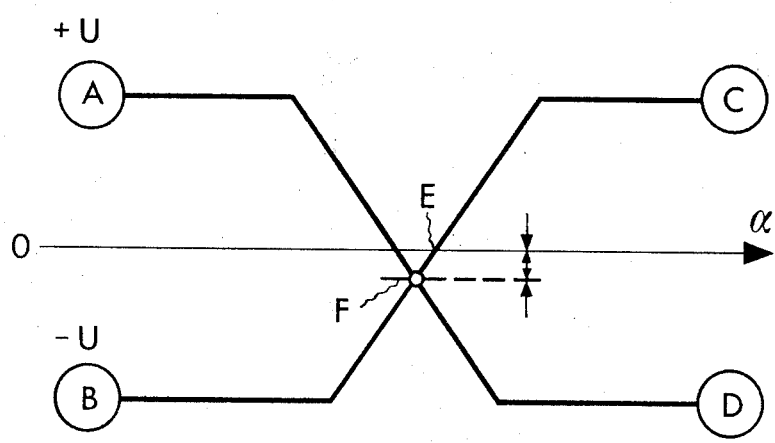
FIG. 8 is a graphical representation of the voltage signals from the probe transmitters during a measuring or testing operation.

FIG. 8 gives a graphical representation of the output voltages or measurement voltages supplied by the signal transmitters 36a, 36b during the deflection of the stylus heads 12a, 12b by a tooth flank. In this connection, the abscissae $\alpha$ indicate the deflection of the stylus heads 12a, 12b relatively to their rest position, and the measurement voltages U are indicated by the ordinates. As long as the stylus head 12a is in the rest position, a voltage A is applied to the output of the signal transmitter 36a, but this voltage, after a certain deflection, changes approximately rectilinearly into the negative voltage D and, with further deflection of the stylus head 12a, once again remains constant. In a similar manner, the signal transmitter 36b, in the rest position of the stylus head 12b, supplies the voltage B, that is negative, that changes linearly with the deflection into the voltage +C, and that with further deflection once again remains constant. E represents the zero voltage of the signal transmitter 36b and F represents the voltage at the cross-over point of the two voltage characteristics A-D and B-C for the signals from the respective stylus heads with respect to deflection of the heads.

Figure 9:
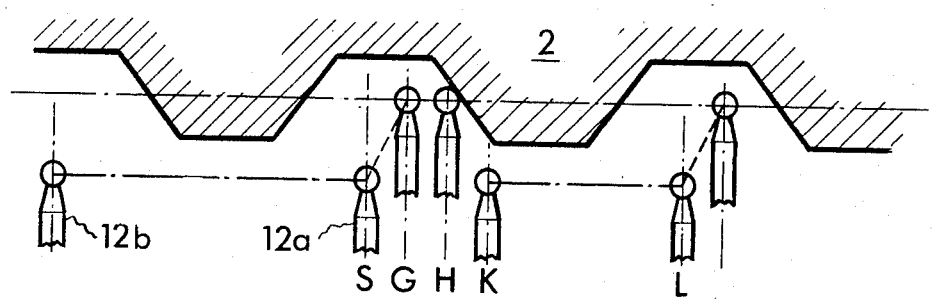
FIG. 9 illustrates the positions of the stylus heads during different stages of a test sequence.

Represented in FIG. 9 are the various positions of the stylus heads 12a, 12b relatively to the tooth flanks of the test gear 2. The figure is more fully explained in the description of the functioning of the apparatus which will follow.

Figure 10:
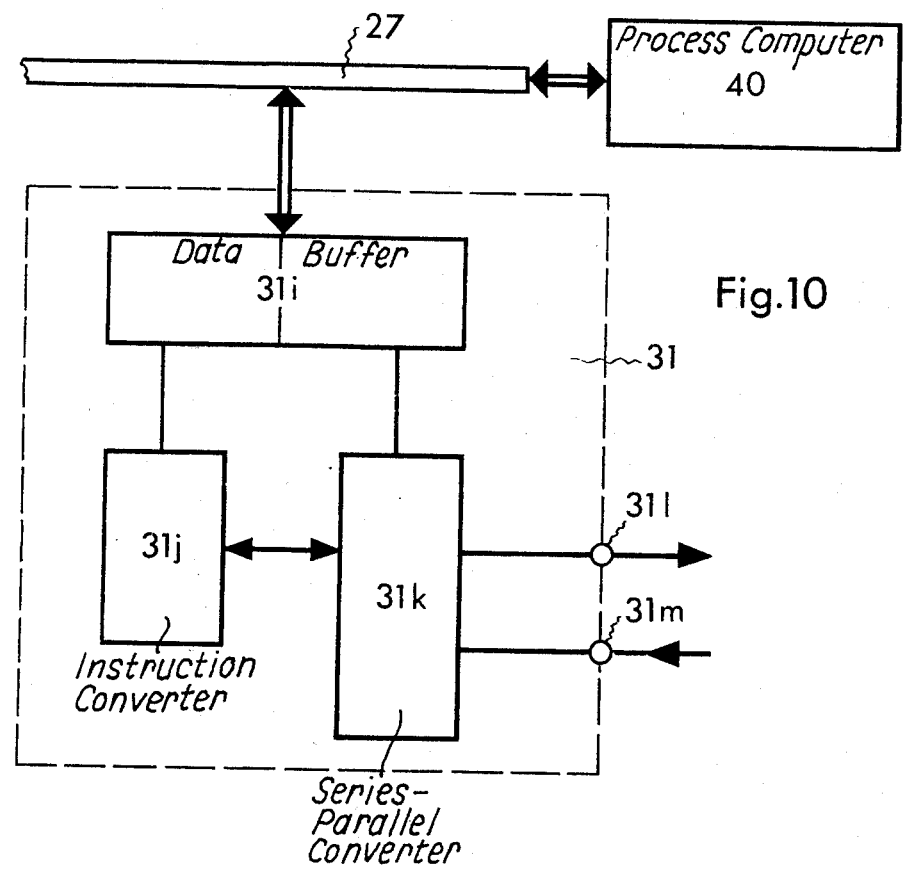
FIG. 10 is a block circuit diagram of a part of the input and output unit of the interface.

FIG. 10 illustrates a part of the input and output unit 31 in the block circuit diagram which is provided for the connection of a teleprinter. The data line 27 is connected to a data buffer 31i, which is connected to the output 31l via an instruction decoder 31j and a series-parallel converter 31k likewise connected to the data buffer 31h. The input 31m of the input and output unit is connected to the series-parallel converter 31k.

The operation of the individual components thus far described is hereinafter explained by reference to a typical operational run-off.

Figure 11:
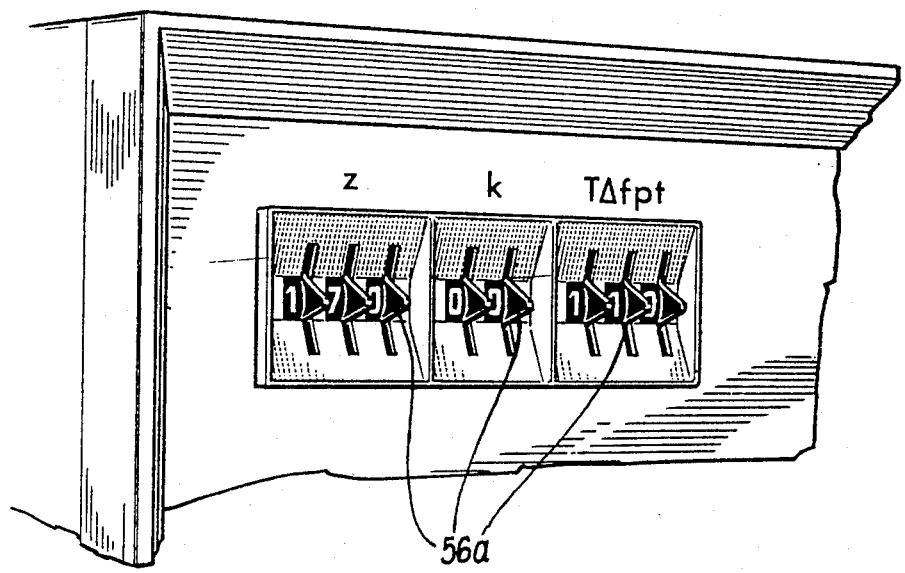
FIG. 11 is a fragmentary view of the control panel of the input and output device showing some of the switches for introducing test reference data.

The data which is necessary for testing the gear, as for example number of teeth, span width (number of the teeth lying between two tooth flanks to be measured), maximum permissible pitch overlap length, maximum permissible total pitch error, are supplied via the teleprinter 53 or the input and output device 56 to the interface 30, for example, by means of decade switches 56a (FIG. 11).

A coarse position adjustment of the slide 11 is first carried out, the slide 11 with the stylus heads 12a, 12b being moved towards the stationary test gear 2 by operation of an appropriate key 25 on the panel 24 so that the stylus heads 12a, 12b bear against the flanks to be measured in the vicinity of the pitch circle. The spacing between the stylus heads 12a, 12b is so set by slackening off the clamping levers 17a, 17b that the needles or pointers of the two analog measuring instruments 23a, 23b are moved in a coarse tolerance field 23c, which is marked on the scale of each instrument. The position of the slide 11 is set as a forward limit position by means of a stop 11a. Then by operating another key 25 on the operating panel 24, the slide is moved back into its initial position, and a further stop 11b set to establish this as a rear limit position. As soon as the slide 11 has once again reached its initial or starting position, through the interface 30 the process computer 40 actuates the control means 57 for the table or mandrel drive 5 so that the test gear 2 starts to rotate. The readiness of the apparatus for successive stages in a test sequence is indicated by flashing push button illumination in the operating keys such as the keys 25 under the actuation of the process computer.

In order to synchronise the turning movement of the test gear 2 with the reciprocating movement of the slide 11 into the gear teeth a further setting operation is now carried out.

As soon as the coarsly adjusted stylus heads 12a, 12b which are situated in their rearward rest position S (FIG. 9), are brought over respective tooth spaces of the test element 2 (in FIG. 9, both the transverse and the radial relative movements are shown as being performed by the stylus heads for the sake of clearer illustration, although the first of these movements will be performed by the gear), a synchronising key 26 on the operating panel 24 is actuated and held. The process computer 40 thereupon sends through the data line 27 a signal to that part of the input and output unit 31 shown in FIG. 6, the signal being decoded by the decoding unit 31f and it bringing the flip-flop 31g into one of its two states. The resulting output of the flip-flop 31b so controls the servo amplifier 31h to move the slide 11 forwardly by means of the drive unit 13 and introduce the stylus heads 12a, 12b-into the respective tooth spaces, the heads covering the path S-G (FIG. 9).

With actuation of the synchronising key 26, the upward-downward counter 31a (FIG. 5) has also been started by the process computer 40 through the data line 27 and the decoder 31f (FIG. 6). The counter 31a is regulated by the oscillator 31b, the frequency $f$ of which serves as a time base for the apparatus. The counter is stopped as soon as the stylus heads 12a, 12b reach their forward end limit position and its setting then is read off through the activating line 31d via the output gates 31c. The counter position read off is sent via the data line 27 to the data store 43 (FIG. 3) and is held therein as a first time marking. In conjunction therewith the counter 31a is started again.

As rotation of the gear continues, the stylus heads 12a, 12b remain in their forward end limit position G (FIG. 9) until they come into contact with a tooth flank of the gear and a measuring process is initiated in their position H (FIG. 9). The counter 31a is once again stopped at this point by means of a signal from the measuring circuit 33 at the instant at which the signal from the transmitter 36b exceeds a rated value, and the counter setting is stored in the data store 43 is a second time marking. (Although the signal from only one transmitter is used in this step, the other transmitter will be providing a signal within the range of measurement.) If the synchronising key 26 of the operating panel 24 is released before the measuring process has been initiated at the point H, then the process is stopped and an alarm is given.

With the completion of the measurement at H, the decoder 31f in the input and output unit 31 is activated by the process computer 40, so that the flip-flop 31g is returned to its other state. This causes the servo amplifier 31h to reverse the slide 11, so that the two stylus heads 12a, 12b are moved out of the tooth spaces of the gear 2 an to their rearward end limit position K, i.e., over the path H-K. Upon completion of the measurement at H, the counter 31a will have again been started upwards by the process computer 40 through the data line 27 and when the rearward end position K is reached, the counter is once again stopped and its position read off through the data line 27 to be stored as a third time marking in the data store 43. Thereafter, the counter 31a is restarted by the process computer 40.

The synchronising key 26 on the operating panel 24 continues to be depressed until the next tooth space of the gear 2 is situated before each stylus head 12a, 12b. At this instant, the synchronising key is released, the synchronising process being thereby completed. The counter 31a is stopped and its setting is read off as a fourth time marking to be held in the data store 43. The two stylus heads 12a, 12b, controlled by the process computer 40, can then move into the tooth space of the test element 2 and again cover the paths S-L (FIG. 9), and so on, with the component time periods which are required for the movement of the stylus heads, and also the waiting times during which the drive means for the slide 11 is not actuated, stored in the data store 43 as timing marks. All these timing marks are added by the process computer 40 and the sum is sent through the data line 27 to the input and output unit 31. The counter 31a is set with these data and starts a downward (negative) counting. If the counter 31a goes below a specified value, for example, because the measurement process it is to initiate at the point H does not take place at the stored counter setting, a transmission signal appears on the counter 31a which is supplied through the line 31e (FIG. 5) to the process computer 40 and corresponding to this signal, the process computer 40 initiates the next movement of the slide 11 and thus of the two stylus heads 12a, 12b.

Since the movements of the slide 11 are split up into separate stages, as indicated by the successive positions S to L (FIG. 9), and these movements are stored separately, when the drive of the gear 2 is non-uniform the synchronising times corresponding to the positions S to L are so modified through the process computer 40 and the input and output unit 31 (FIG. 4) that a satisfactory synchronisation of the movements of the slide 11 and of the rotating gear 2 is guaranteed. This also applies with span measurements in which not each tooth space is measured.

The electrical signal transmitters 36a and 36b (FIG. 7) each produce a signal which is proportional within their measurement range (FIG. 8) to the deflection of the stylus heads 12a and 12b, and these signals are transmitted to the analog measuring circuit 33. In the example which is given in FIG. 8, during the measuring process, the output voltage A-D of the signal transmitter 36a is applied to one input of the measuring circuit 33 and the voltage B-C of the signal transmitter 36b is applied to the other input. Before the run-off referred to above, the digital-analog converter 34 (FIG. 7) would be set at zero by the process computer 40 through the data line 27, so that a zero voltage is at its output. As soon as the voltage curve B-C passes through zero (point E in FIG. 8), the comparator 33a activates the internal time sequence control member 33b. As a result, the analog storage circuit 33c is keyed, so that the voltage F, which is at the relevant input of the analog storage circuit 33c at the instant of passing the zero E, is held on the one input of the analog-digital converter 32. By means of the control member 33b, the converter 32 is also activated, which digitises the analog voltage F lying at its analog input. After conversion is completed, the measured value of the voltage F is taken in digital form via the data line 27 to the process computer 40 and held in the data store 43.

Other measurements follow independently, synchronisation between the rotating gear 2 and the stylus heads 12a, 12b penetrating into the tooth spaces of the gear giving a repeated cycle of movements as described above. During these measurements, according to the quality of the gear 2, each time another pitch is measured different values are produced for the voltage F. After each measurement, the digitised value of the voltage F is stored by the process computer 40 in the data store 43. If $n$ measurements are made, the average value of the voltage F is calculated by the computer 40. This calculated value is sent as a correction value from the process computer 40 via the data line 27 with opposite sign to the digital-analog converter 34, so that the response voltage of the comparator 33a is shifted by the average amount of $$\frac{\sum_{o}^{n} F n}{n}$$

towards the zero point. This represents a very accurate zero point adjustment of the measuring system, although initially only a coarse setting of the stylus heads 12a, 12b has been made. In other words as a result of this electronic fine adjustment, an accurate and tedious mechanical fine setting of the spacing of the stylus heads 12a, and 12b becomes superfluous.

After this fine adjustment, which has been effected automatically, the actual measurement or test series is initiated at the operating panel 24 through a key 25 with the symbol "measure," the readiness for this stage being indicated, as already described by a flashing light in the key actuated by the process computer, and the said series thereupon proceeds automatically. During the measuring process, measurement data, such as single pitch errors and pitch overlap length can be issued via the measurement value printer 51, the chart recorder 52 or the teleprinter 53.

When the required number of measurements has been carried out, the computer 40, through the interface 30, stops the reciprocating movement of the slide 11 and also the rotational movement of the gear 2.

The processing in the process computer 40 of the measurement values supplied by the measurement signal transmitters 36a, 36b is hereinafter more fully explained.

Let the nuber of the measurements be 1,2,3,..., m...,k.

During the measuring process, the relative circular pitch errors $f_{ptr}$ and the pitch overlap length $\Delta f_p$ can be issued directly, $\Delta f_p$ always being compared by the process computer 40 with a maximum value introduced prior to the measurement via the input and output device 56 or the teleprinter 53. Such reference values are preferably fed into the apparatus by the use of binary decade switches 56a (FIG. 11) on the input and output device.

If the relative circular pitch error $f_{ptr}$ during the measurement is:

$$f_{ptr1}; f_{ptr2} \cdots; f_{ptrm} \cdots; f_{ptrk};$$

the pitch overlap length $\Delta f_p$ during the measurement then amounts to:

$\Delta f_{p1} = f_{ptr2} - f_{ptr1}$
$\Delta f_{pm} = f_{ptr(m+1)} - f_{ptrm}$
$\Delta f_{pk} = f_{ptr1} - f_{ptrk}$ If the prescribed maximum value of the pitch overlap length $\Delta f_p$ is exceeded, then an alarm is actuated by the process computer 40 and/or a record of this is printed on the printer 51 and/or on the teleprinter 53.

After completing the measuring process, the process computer 40 elevates the measurement values obtained. The evaluating process takes a very short time, so that immediately following the measuring process, the elevated data can be issued via the printer 51, the chart recorder 52, the teleprinter 53 or via the data link 50 as a transmission device. By way of example, in such a case the following values are issued:

Circular or single pitch error $f_{pt}$:

$$f_{pt1} = f_{ptr1} - \frac{f_{ptr1} + f_{ptr2} \ldots + f_{ptrm} \ldots + f_{ptrk}}{k}$$

$$f_{ptm} = f_{ptrm} - \frac{f_{ptr1} + f_{ptr2} \ldots + f_{ptrm} \ldots + f_{ptrk}}{k}$$

$$f_{ptk} = f_{ptrk} - \frac{f_{ptr1} + f_{ptr2} \ldots + f_{ptrm} \ldots + f_{ptrk}}{k}$$

After the evaluating process, the pitch overlap length $\Delta f_p$ is equal to that already measured during the measurement, apart from:

$$\Delta f_{pk} = f_{pt1} - f_{ptk}$$

With the high measurement sensitivities with which measurements can be made with the pitch tester, it is particularly advantageous to establish the curve of the cumulative pitch error, with which, in contrast to the customary curve of the relative cumulative pitch error, the starting and ending points are positioned on a horizontal line; this is carried out with the aid of the process computer 40.

For this purpose, a correcting value $$K_{Fpm} = m \frac{\Sigma f_{ptr}}{k}$$

is introduced, with which is achieved that upward slope of the reference line obtained with the recording of the relative cumulative pitch error and caused by the setting errors of the stylus heads 12a, 12b, is suppressed.

The cumulative pitch error $F_p$ is issued in the form $$F_{p1} = F_{pr1} - \frac{\Sigma f_{ptr}}{k}$$

$$F_{pm} = F_{prm} - m \frac{\Sigma f_{ptr}}{k}$$

$$F_{pk} = F_{prk} - k \frac{\Sigma f_{ptr}}{k}$$

$$F_{pk+1} = F_{p1}$$

$F_{prm}$ corresponding to the uncorrected cumulative pitch error ($F_{prm} = \Sigma f_{ptrm}$). If all required measurement data are issued, the printer 51 or the teleprinter 53 prints out the total pitch error $F_p$ (= positive maximal value of the cumulative pitch error). The curve of the cumulative pitch error is completed after the measurement of the pitches along the gear after little more than one revolution.

Obviously, the curve of the absolute cumulative pitch error can also be calculated from intermediate storage of the absolute separate pitch errors.

After the evalutating process has been carried out, a new measurement or test series can take place and the values stored in the store 43 of the process computer 40 are able, after actuating a printing key on the input and output unit 56, to be once again issued in any arbitrary sequence via the printer 51, the chart recorder 52, the teleprinter 53 or the data link 50.

If measurements are made on the same test element 2 at axially different positions across the tooth width, adjustement of the stylus unit position relative to the tooth width being effected by the control unit 6a, the measurement values are initially stores in the process computer 40 and are only evaluated after the last measurement. In this case, the measures values are selected according to maxima and minima and are related to one another. The result is then produced in the manner described.

If several elements of the same type are tested, the evaluation and issuing of the results is effected as a whole in such a way that the maximum deviation values of all the test elements are established and controlled for possible tolerance excesses. All measurement and output values are capable of being questioned as often as desired after measurements have taken place.

The input and output unit 31 is equipped for the connection of the teleprinter 53, so that the required data can also be newly introduced and issued by way of the said teleprinter. This has the advantage that the resulting values can be sent out in table form as a test record with a short description of the test element 2. A conventional teleprinter code with start, stop and parity symbols can be used for the transmission between the input and output unit 31 and the teleprinter 53.

The input and output unit 31 (FIG. 10) is brought into a waiting position via the data line 27 by the process computer 40 through the data buffer 31i, which is constructed in known manner, and the information decoder 31*j*. The first start signal arriving through the receiver line 31*m* activates the series-parallel converter 31*k*. This brings the entire word sent in series by the teleprinter 53 into a parallel form and transmits it to the data buffer 31*i*. The process computer 40 receives the information by way of the data line 27 and holds it in the data store 43. After completing the input via the teleprinter 53, all marginal data are stored and are called upon as required by the programme, which is stored in the programme store or memory 44.

Possible marginal data and other entries, apart from the tooth number already mentioned and the maximum permissible tolerance of the pitch overlap length, are the span tooth number (i.e., the number of teeth spanned between the two probes), the required method of delivery by the teleprinter 53 and chart recorder 52, the feed rate and the magnification of the chart recorder 52 and also the comments making easier, the recording of the resulting data.

If bits of information are sent out via the teleprinter 53, these data, e.g. the measurement values, are called up from the data store 43 by the process computer 40 and sent via the data line 27 to the input and output unit 31. The data buffer 31*i* stores these data and, when the teleprinter 53 has written out the preceding bits of information, passes them on to the parallel-series converter 31*k*. The latter adds the necessary start, stop and parity signals and sends the data via the output line 31*l* to the teleprinter 53.

What we claim and desire to secure by letters patent is:

1. Gear pitch testing apparatus comprising: a base, a mounting on said base, two probe elements arranged side-by-side on said mounting, means for displacing the mounting on the base to introduce the elements into a respective pair of tooth spaces of a gear to be tested, a support on said base for a gear to be tested, means for causing relative displacement between said support and said mounting for displacement of the gear under test transversely relative to said probe elements in a linear or rotary path, respective signal transmission means in operative association with the probe elements to produce electrical signals in dependence upon the deflection of the elements by the gear tooth flanks, measurement value means connected to said signal transmission means to derive, from said signals, further signals to actuate displacements of the mounting and to provide measurement values corresponding to the relative separate or circular pitch errors, the apparatus further comprising a counter and time base generation means coupled with said counter, a digital process computer being connected to said means providing the measurement values and to said counter and comprising means for controlling the operation of said counter in synchronism with predetermined displacement steps of the mounting for obtaining time settings for said displacement steps of said mounting in sequence with said transverse relative displacement between the gear and the probe elements, a store in said process computer for said measurement values and for said timing settings and the computer including means for computing from the stored data, deviations in pitch in the gear under test.

2. Apparatus according to claim 1 having a measurement circuit, an analog-digital converter and a digital-analog converter connecting the circuit to the process computer, first and second inputs on the analog-digital converter, an analog store connected to one of said signal transmission means and said store connecting said transmission means to the first input of the analog-digital converter, the apparatus further comprising a comparator and time sequence control means, respective inputs of said comparator being connected to the other of said signal transmission means and to the digital-analog converter, an output of said comparator being connected to the time sequence control means for keying said analog store to said second input of the analog-digital converter and to activate said converter.

3. Apparatus according to claim 1 wherein means are provided to regulate the pattern of movement of the mounting relative to the gear, said means comprising a synchronising control element connected to the process computer for actuation of the counter to evaluate counter settings at which predetermined steps of said pattern of movement are completed, the process computer store retaining said settings for repetition of the pattern movement.

4. Apparatus according to claim 3 comprising means for starting the counter and simultaneously moving the mounting into a forward end position towards the gear upon actuation of said control element, means for reading off and storing the counter setting at said end position, means for producing an actuating signal from the transmission means of the forwardly disposed probe elements upon engagement with a tooth flank through relative transverse displacement between said elements and the gear to actuate the reading off and storage of a second counter setting, means operative with emission of said signal for causing displacement of the mounting away from the gear to an end position spaced from the gear at which a third setting of the counter is read off and stored, and means operative aftr further relative displacement to a position corresponding to the initial position but at a subsequent tooth space for reading off and storing the counter setting upon release or disengagement of said control element, the store thereafter being arranged to set the counter with the sum of counter settings so that forward and rearward displacement of the mounting is controlled in accordance with the stored counter settings.

5. Apparatus according to claim 4 comprising means for transmitting from the counter a signal to the process computer dependent upon the difference between a stored counter setting and an actual counter setting at the corresponding point in a cycle of displacement of the mounting in response to a predetermined measurement signal, means controlling said displacements of the mounting in accordance with said counter signal in the subsequent measurement process.

6. Apparatus according to claim 1 wherein a bistable element is connected to the counter through the process computer, the state of said element being determined by the counter setting and servo amplifying means connected to the bistable element, said element acting therethrough to control the mounting displacement means in accordance with the state of said element.

7. Apparatus according to claim 1 wherein means are provided to rotate the gear during testing and a control line connects the process computer to said rotation means.

8. Apparatus according to claim 1 comprising a series of manual switching elements for initiating a series of stages in a test sequence and means controlled by the process computer to indicate the readiness for actuation of said elements at their respective stages of said sequence.

9. Apparatus according to claim 1 provided with an input and output unit for introducing gear data and/or maximum error data as input values for the program of the process computer.

10. Apparatus according to claim 9 wherein said unit comprises decade switches for at least some of said input values.

11. Gear pitch testing apparatus comprising: a base, first and second supports on said base, means for rotary displacement of said first support on the base and means for mounting upon said first support a gear to be tested, said second support comprising means for displacement on the base radially of said rotatable first support, two probe elements arranged side by side on said second support for introduction into a respective pair of tooth spaces of the gear to be tested by said radial displacement of their support for sensing respective tooth flank surfaces of the gear, respective probe signal means connected to the probe elements for producing electrical signals in dependence upon sensing by the elements of the respective gear tooth flank surfaces, measurement value means connected to said probe signal means for deriving further signals from said signals therefrom to actuate relative displacements between said supports and to provide measurement values corresponding to the relative separate or circular pitch errors of the gear teeth, means for causing step-wise displacements of the probe elements relative to their support for the operation of said probe signal means, said displacement means comprising a counter and time base generation means coupled with said counter for providing timing settings for the displacement steps of the probe elements in synchronism with the rotary displacement of the gear under test, a digital process computer being connected to said measurement value means and to said counter, said process computer comprising means for controlling the operation of said counter in synchronism with said displacement steps of the probe elements for obtaining timing settings for said displacement steps in sequence with said rotation of the gear support, a store in said process computer for said measurement values, means in said computer for evaluating a setting error from a successive series of tooth movements with the probe elements mounted in a coarse setting and for applying a compensating correction related to the error evaluated, the apparatus further comprising a series of manual switching elements for actuating a series of setting stages in a test sequence for the gear, and means controlled by said process computer for indicating at the associated stages of the test sequence the state of readiness of the manual switching elements.

* * * * *